United States Patent
Chung et al.

(10) Patent No.: US 8,459,429 B2
(45) Date of Patent: Jun. 11, 2013

(54) POWER TRANSMISSION DEVICE FOR A WATER PUMP

(75) Inventors: Suk-Jae Chung, Daejeon (KR);
Eun-Young Seo, Daejeon (KR);
Sung-Taeg Oh, Daejeon (KR);
Seong-Gyu Gong, Daejeon (KR)

(73) Assignee: Halla Climate Control Corp. (KR)

( * ) Notice: Subject to any disclaimer, the term of this patent is extended or adjusted under 35 U.S.C. 154(b) by 0 days.

(21) Appl. No.: 13/526,691

(22) Filed: Jun. 19, 2012

(65) Prior Publication Data

US 2012/0247908 A1 Oct. 4, 2012

Related U.S. Application Data

(63) Continuation of application No. PCT/KR2010/008900, filed on Dec. 13, 2010.

(30) Foreign Application Priority Data

Dec. 23, 2009 (KR) ......... 10-2009-0129985
Dec. 23, 2009 (KR) ......... 10-2009-0129986
Sep. 13, 2010 (KR) ......... 10-2010-0089584

(51) Int. Cl.
*F01P 5/12* (2006.01)
*F16D 27/10* (2006.01)
*F16D 27/112* (2006.01)

(52) U.S. Cl.
USPC ....... 192/90; 192/53.2; 192/53.51; 192/84.92

(58) Field of Classification Search
USPC ............ 192/53.2, 53.51, 69.71, 84.92, 84.93, 192/84.94, 90
See application file for complete search history.

(56) References Cited

U.S. PATENT DOCUMENTS

| 3,162,285 A | 12/1964 | Sala | |
|---|---|---|---|
| 4,397,380 A * | 8/1983 | Yew | 192/90 |
| 4,555,003 A * | 11/1985 | Phillips | 192/53.51 |
| 6,481,390 B1 | 11/2002 | Robb | |
| 6,915,887 B2 * | 7/2005 | Faller et al. | 192/90 |
| 2010/0126822 A1 * | 5/2010 | Winkler et al. | 192/90 |

FOREIGN PATENT DOCUMENTS

| KR | 10-2009-0020848 A | 2/2009 |
|---|---|---|
| KR | 10-2009-0062002 A | 6/2009 |

OTHER PUBLICATIONS

International Search Report (PCT/KR2010/008900), Aug. 8, 2011.

* cited by examiner

*Primary Examiner* — Rodney Bonck
(74) *Attorney, Agent, or Firm* — Park & Associates IP Law, P.C.

(57) ABSTRACT

The present invention relates to a power transmission device for a water pump, including a pulley, a magnetic flux generator, a disk assembly, and a hub assembly, wherein the disk assembly has a disk, a friction ring for providing a frictional contact with the hub assembly, and a resilient ring adapted to pressurize the friction ring toward the hub assembly, so that when the attracting magnetic flux of the magnetic flux generator is not applied, the friction ring makes a frictional contact with the hub assembly through the resilient pressurization of the resilient ring, whereas, when it is applied, the disk moves toward the pulley to allow the frictional contact between the friction ring and the hub assembly to be released.

11 Claims, 8 Drawing Sheets

FIG. 10

POWER TRANSMISSION DEVICE FOR A WATER PUMP

REFERENCE TO RELATED APPLICATIONS

This is a continuation of pending International Patent Application PCT/KR2010/008900 filed on Dec. 13, 2010, which designates the United States and claims priority of Korean Patent Application No. 10-2009-0129985 filed on Dec. 23, 2009, Korean Patent Application No. 10-2009-0129986 filed on Dec. 23, 2009 and Korean Patent Application No. 10-2010-0089584 filed on September 13, 2010, the entire contents of which are incorporated herein by reference.

FIELD OF THE INVENTION

The present invention relates to a power transmission device for a water pump, and more particularly, to a power transmission device for a water pump for cooling an automobile engine, wherein power regulation between a disk and a hub in the water pump can be accurately performed, rotation synchronization between them can be stably achieved, and the damage of the parts can be prevented.

BACKGROUND OF THE INVENTION

A water pump for a vehicle is adapted to pressurize and transmit cooling water to an engine, so that the cooling water is circulated in the engine and the heat of the engine is thus released. In the same manner as a compressor of an air conditioner, the water pump is activated by the rotary power applied from the engine. That is, the water pump is generally operated together with the activation of the engine, thereby supplying the cooling water to the engine.

Figure 1:
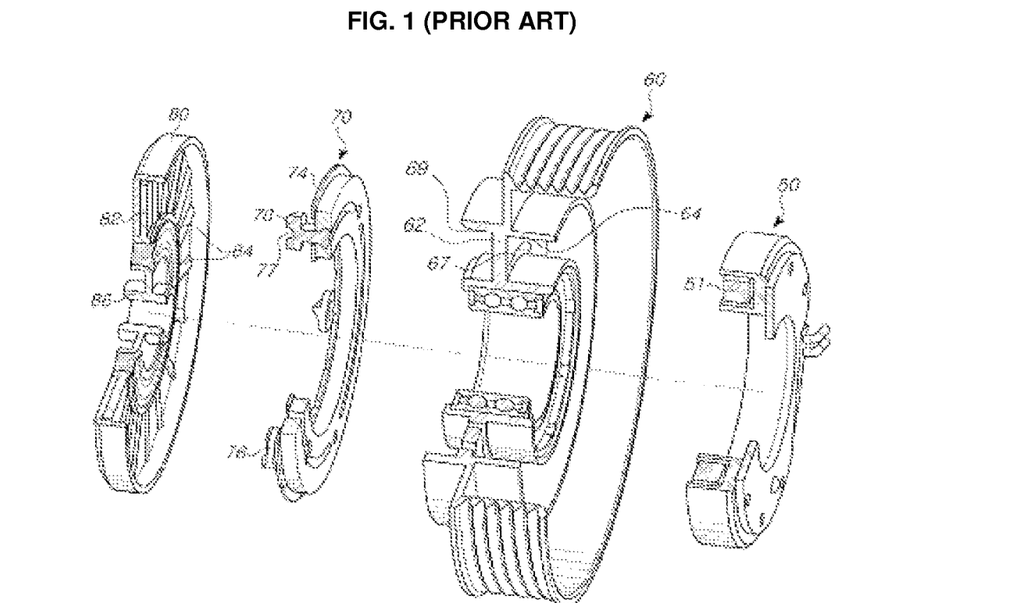
FIG. 1 is an exploded perspective view showing a power transmission device for a water pump in a conventional practice.

FIG. 1 is an exploded perspective view showing a power transmission device for a water pump in a conventional practice, wherein the conventional power transmission device for a water pump includes a pulley 60 adapted to receive the rotary power of an engine through a belt mounted thereon.

The pulley 60 has a field coil assembly-mounting space 64 formed on one side surface (on the right side in the drawing) so as to mount a field coil assembly 50 into which a field coil 51 is embedded thereon. The pulley 60 also has a moving space 69 formed on the opposite side to the field coil assembly-mounting space 64, in which a disk 70 is movably mounted.

If power source is applied to the field coil 51, the disk 70 is moved to the pulley 60 by means of an attracting magnetic flux generated from the field coil 51 and is thus separated from a hub assembly 80. Contrarily, if the power source applied to the field coil 51 is removed, the disk 70 is returned to its original position and is thus coupled to the hub assembly 80.

A resilient member 74 attached to the periphery of the disk 70 is fixed to the moving space 69 of the pulley 60 to apply a resilient force to the disk 70, so that the disk 70 is brought into close contact with the hub assembly 80. When the disk 70 is moved to the pulley 60 by means of the generation of the attracting magnetic flux, resilient deformation occurs around the periphery of the resilient member 70 fixed to the pulley 60, so that the disk 70 is separated from the hub assembly 80.

The disk 70 has a plurality of rivets 76 coupled thereto in such a manner as to be protruded toward the hub assembly 80. The rivets 76 have interlocking grooves 77 formed at the front ends thereof, and the interlocking grooves 77 are lockedly coupled to interlocking protrusions 84 formed on the side surface of an interlocking plate 82 of the hub assembly 80.

Each interlocking groove 77 has a shape corresponding to each interlocking protrusion 84, and as the interlocking groove 77 is lockedly fitted to the interlocking protrusion 84, the disk 70 and the hub assembly 80 can be rotated together.

The hub assembly 80 has a hub 86 disposed at the center thereof, and the hub 86 has the rotary shaft for driving the water pump press-fitted thereto, so that the hub 86 rotates as the rotary shaft rotates.

According to the conventional power transmission device for the water pump under the above-mentioned configuration, if power source is applied to the field coil 51, the field coil 51 generates the attracting magnetic flux therefrom, which is applied to the disk 70 and exceeds the resilient force of the resilient member 74, so that the disk 70 is moved to the pulley 60 within the moving space 69. Accordingly, the lock fitting between the rivets 76 and the interlocking protrusions 84 is released, and the disk 70 is thus separated from the hub assembly 80. Even though the pulley 60 is rotated by means of the power applied from the engine, therefore, the power is not transmitted to the rotary shaft mounted on the hub assembly 80, and thus, the cooling water is not supplied to the engine.

So as to supply the cooling water to the engine, the application of the power to the field coil 51 shuts off. As a result, the attracting magnetic flux is not generated from the field coil 51, and the disk 70 is moved to the direction being distant from the pulley 60 within the moving space 69 by means of the resilient force of the resilient member 74. Accordingly, the interlocking grooves 77 of the rivets 76 are lockedly fitted to the interlocking protrusions 84 of the hub assembly 80, and thus, the hub assembly 80 is coupled to the disk 70, thereby being rotated together with the disk 70. Furthermore, an impeller coupled to one end of the hub assembly is rotated together with the rotary shaft, thereby supplying the cooling water to the engine.

Like this, if the power transmitted from the pulley 60 to the disk 70 is regulated through the application of the power source to the field coil 61 or the shut-off of the application of the power source, the power regulation can be performed rapidly and accurately, and at the same time, the rotation synchronization can be achieved at a high speed and stably.

According to the conventional power transmission device for a water pump, however, some problems occur when the interlocking grooves 77 of the rivets 76 of the disk 70 are lockedly fitted to the interlocking protrusions 84 on the interlocking plate 82 of the hub assembly 80. Through the movement of the disk 70 toward the hub assembly 80, in more detail, when the rivets 76 being rotated are brought into contact with the interlocking plate 82 being in a stop state, the interlocking grooves 77 should be lockedly fitted to the interlocking protrusions 84 in a reliable manner, but the lock fitting is not carried out momentarily and accurately, thereby making the synchronization typically delayed. In this process, the interlocking grooves 77 and the interlocking protrusions 84 have just matching coupling to each other, thereby generating abnormal noises during the lock fitting process and causing the wearing and damage on the interlocking grooves 77 and the interlocking protrusions 84. These problems undesirably make the reliability in the operation of the power transmission device deteriorated badly.

SUMMARY OF THE INVENTION

Accordingly, the present invention has been made in view of the above-mentioned problems occurring in the prior art, and it is an object of the present invention to provide a power transmission device for a water pump for cooling an automobile engine, wherein power regulation between a disk and a hub in the water pump can be rapidly and accurately performed, while the wearing and damage of the parts can be prevented.

To accomplish the above object, according to the present invention, there is provided a power transmission device for a water pump, the device including: a pulley being rotated by a torque applied from an engine and having a magnetic flux generating means-mounting portion formed on one side surface thereof and a disk assembly-mounting portion formed on the opposite side surface to one side surface thereof; a magnetic flux generating means mounted on the magnetic flux generating means-mounting portion of the pulley to generate an attracting magnetic flux therefrom; a disk assembly mounted on the disk assembly-mounting portion of the pulley and adapted to have frictional contact with a hub assembly; and the hub assembly having a drive shaft mounted thereon and a frictional contact surface adapted to have the frictional contact with the disk assembly, the drive shaft being rotated through the frictional contact with the disk assembly, wherein the disk assembly includes: a disk made of a magnetic material; a friction ring frictionally contacting with the frictional contact surface of the hub assembly; and a resilient ring interposed between the disk and the friction ring in such a manner as to be fixed to the disk assembly-mounting portion of the pulley and adapted to resiliently pressurize the friction ring toward the hub assembly, whereby when the attracting magnetic flux of the magnetic flux generating means is not applied, the friction ring makes frictional contact with the hub assembly through the resilient pressurization of the resilient ring, whereas, when the attracting magnetic flux is applied, the disk moves toward the pulley to allow the frictional contact between the friction ring and the hub assembly to be released.

According to the present invention, desirably, the resilient ring includes at least one installing member adapted to fix the disk assembly to the disk assembly-mounting portion of the pulley and at least one resilient member formed on the installing member.

According to the present invention, desirably, the installing member includes an outer ring and an inner ring fixed correspondingly to an outside wall and an inner wall of the disk assembly-mounting portion of the pulley, and the resilient member includes resilient arms having a form of an arch-shaped cantilever between the outer ring and the inner ring.

According to the present invention, desirably, the resilient ring includes a support ring fixed to an inner side wall of the disk assembly-mounting portion of the pulley and protruding portions extended radially from the support ring in such a manner as to be fixed to the outer side wall of the disk assembly-mounting portion, and the resilient member includes resilient arms having a form of an arch-shaped cantilever extended from the protruding portions in the circumferential direction of the support ring.

According to the present invention, desirably, the installing member further includes: a plurality of head rivets adapted to be passed through coupling holes formed on intermediate portions of the resilient arms and to couple the intermediate portions 244g of the resilient arms with the disk, each head rivet having a protruding head passed through the friction ring; and a fitting means having a plurality of grooves formed on the frictional contact surface of the hub assembly in the circumferential direction thereof and an interlocking hole formed at the most front portion of each groove, whereby when the friction ring and the hub assembly have the frictional contact therebetween, the protruding heads of the head rivets are lockingly fitted to the grooves formed on the frictional contact surface of the hub assembly and as they are moved along the grooves, they are insertedly fitted to the interlocking holes.

According to the present invention, desirably, each resilient arm having a form of an arch-shaped cantilever has a free end portion extended in the circumferential direction toward the opposite direction to the rotating direction of the drive shaft.

According to the present invention, desirably, each resilient arm having a form of an arch-shaped cantilever has a free end portion extended in the circumferential direction toward the rotating direction of the drive shaft.

According to the present invention, desirably, at least a portion of each of the frictional surface of the friction ring and the frictional contact surface of the hub assembly is formed of a friction material having a friction coefficient of more than 0.3.

According to the present invention, desirably, the number of resilient arms is more than three.

According to the present invention, desirably, each of the frictional surface of the friction ring and the frictional contact surface of the hub assembly is formed of a flat frictional surface.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE INVENTION

Hereinafter, an explanation on a power transmission device for a water pump according to preferred embodiments of the present invention will be in detail given with reference to the attached drawings.

Figure 2:
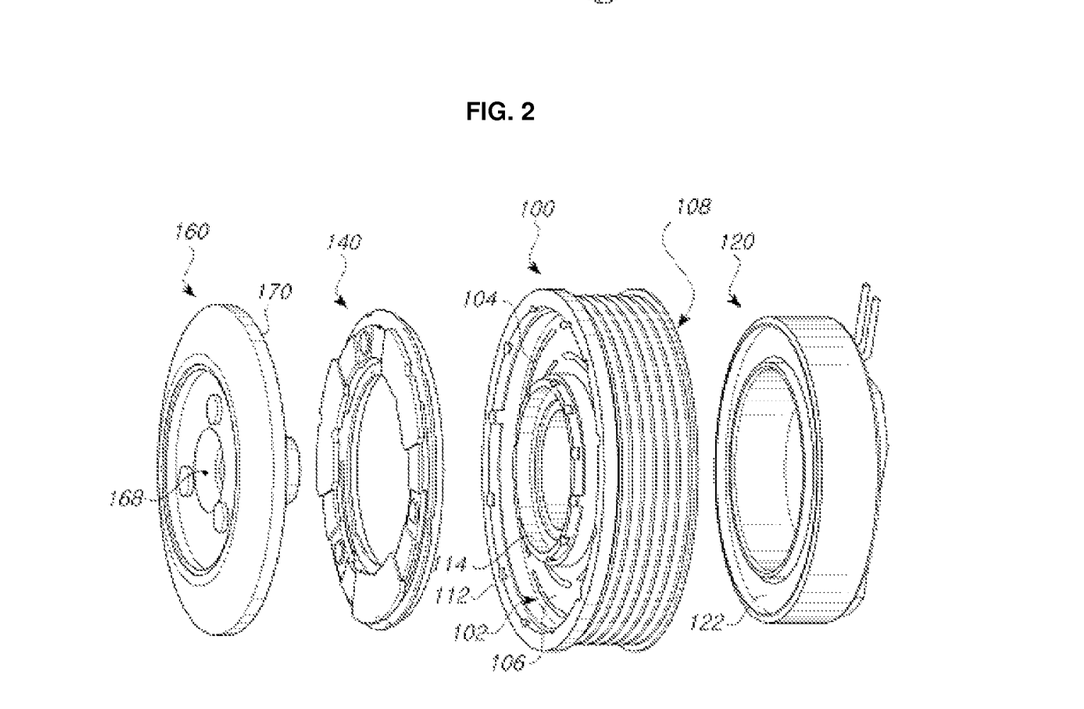
FIG. 2 is an exploded perspective view showing a power transmission device for a water pump according to a first embodiment of the present invention.

FIG. 2 is an exploded perspective view showing a power transmission device for a water pump according to a first embodiment of the present invention. The power transmission device for a water pump according to the first embodiment of the present invention has a pulley 100 adapted to receive power applied from an engine through a belt mounted thereon. The power applied to the pulley 100 is transmitted to a hub assembly 160 by means of a disk assembly 140. Further, a rotary shaft (not shown) mounted at the center of the hub assembly 160 rotates as the hub assembly 160 rotates. An impeller (not shown) is disposed on the rear end portion (on the left end in the drawing) of the rotary shaft rotating along with the hub assembly 160, and the impeller presses and supplies cooling water to the engine.

The pulley 100 is formed of a generally donut-like member open on the center thereof and has a field coil assembly mounting portion 108 concavedly formed on one side surface thereof, that is, on the right side in the drawing, to mount a field coil assembly 120 as a magnetic flux generating means thereinto. As a result, the field coil assembly 120 is insertedly fitted to the field coil assembly-mounting portion 108 concavedly formed on one side surface of the pulley 100. A field coil embedded in the field coil assembly 120 generates a magnetic flux therefrom through the application of the power thereto, so that a disk 146 in the disk assembly 140 is attracted toward the pulley 100.

The pulley 100 has a disk assembly-mounting portion 102 formed concavedly in a shape of a ring on the opposite side surface to one side surface thereof. The disk assembly-mounting portion 102 is a space formed correspondingly to the field coil assembly-mounting portion 108, in which the disk assembly 140 is accommodated. The pulley 100 has an intermediate plate 106 defining the disk assembly-mounting portion 102 and the field coil assembly-mounting portion 108 thereby, and the intermediate plate 106 has a plurality of magnetic field slots 104 formed thereon. The magnetic field slots 104 are formed to allow the disk assembly-mounting portion 102 and the field coil assembly-mounting portion 108 to communicate with each other, so that the magnetic flux generated from the field coil 122 embedded in the field coil assembly 120 is applied to the disk assembly-mounting portion 102 of the pulley 100.

The ring-shaped disk assembly 140 is mounted in the interior of the disk assembly-mounting portion 102 of the pulley 100. The disk assembly 140 includes the disk 146 made of a magnetic material, a friction ring 142 having frictional contact with a frictional contact surface 170 of the hub assembly 160 as will be discussed later, and a resilient ring 144 interposed between the disk 146 and the friction ring 142 in such a manner as to be fixed to the disk assembly-mounting portion 102 of the pulley 100 and adapted to resiliently pressurize the friction ring 142 toward the hub assembly 160.

Figure 3:
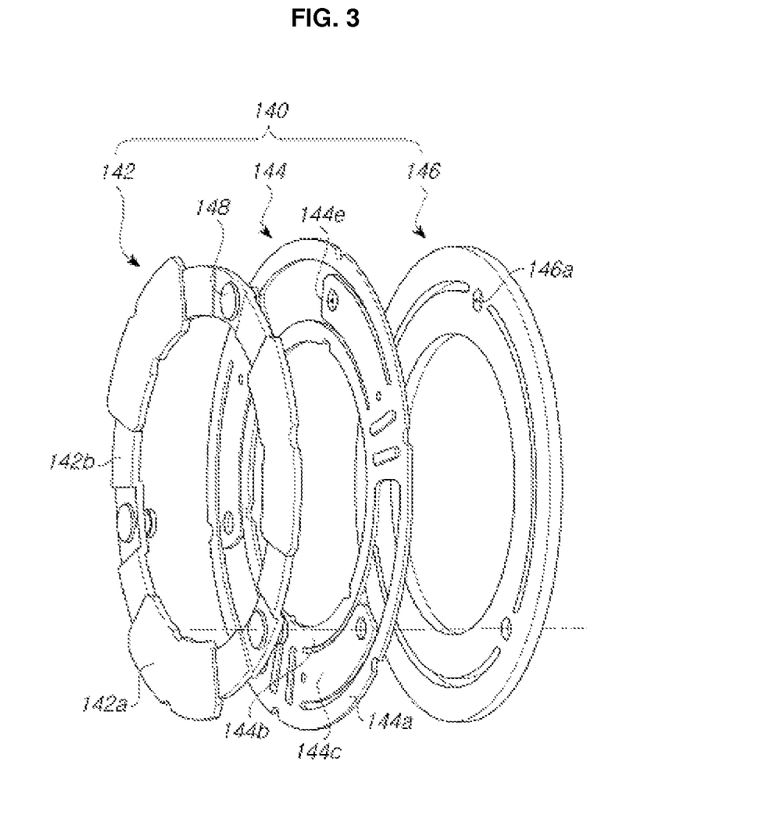
FIG. 3 is an exploded perspective view showing a configuration of a disk assembly in the power transmission device for a water pump of FIG. 2.

As shown in FIG. 3, the resilient ring 144 has a roughly ring-like shape and includes an outer ring 144a and an inner ring 144b serving as a installing member, and resilient arms 144c serving as a resilient member, which are disposed in a form of an arch-shaped cantilever between the outer ring 144a and the inner ring 144b. The outer ring 144a and the inner ring 144b serve to fixedly seat the disk assembly 140 into the disk assembly-mounting portion 102 of the pulley 100. The outer ring 144a and the inner ring 144b are fixed correspondingly to an outside wall 112 and an inner wall 114 of the disk assembly-mounting portion 102 of the pulley 100 by means of caulking.

Moreover, the friction ring 142 and the disk 146 are fixed to each other by means of rivets 148, and at this time, the rivets 148 are passed through coupling holes 144e formed on the free ends of the resilient arms 144c.

The resilient ring 144 of the disk assembly 140 is in a state of being fixed to the disk assembly-mounting portion 102 of the pulley 100, and the friction ring 142 and the resilient ring 144 are in a state of maintaining resilient support by which the resilient arms 144c as the resilient member pressurize the friction ring 142 toward the hub assembly 160, while having a given distance therebetween by means of the resilient arms 144c. The disk 146 is in a state of being contacted with the resilient ring 144. Further, the friction ring 144 is in a state of being supported movably in the left and right directions, while being coupled integrally with the disk 146 by means of the rivets 148.

The friction ring 142 also has a roughly ring-like shape. In the first embodiment of the present invention, the friction ring 142, which has frictional contact with the frictional contact surface 170 of the hub assembly 160, has a plurality of convex portions 142a relatively more protruded than the frictional surface thereof and a plurality of concave portions 142b relatively more depressed therethan, in an alternating manner. In this embodiment, three convex portions 142a and three concave portions 142b are formed.

Figure 7:
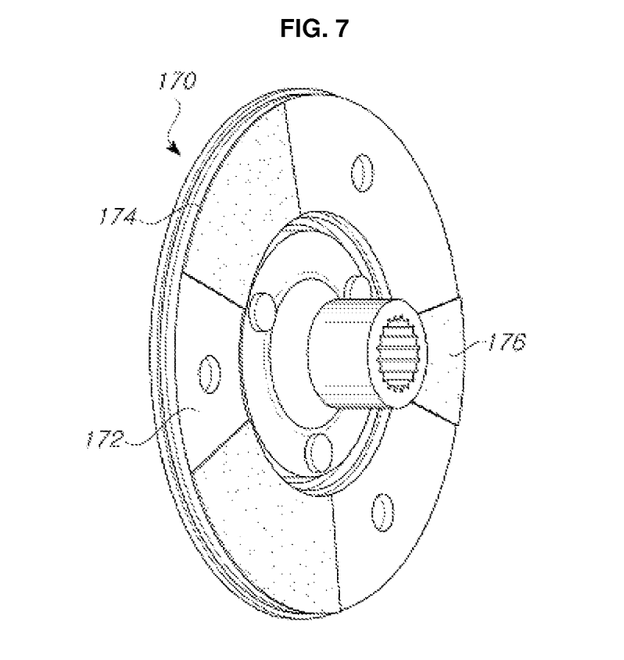
FIG. 7 is an exploded perspective view showing a hub assembly in the power transmission device for a water pump of FIG. 2.

The convex portions 142a and the concave portions 142b are coupled respectively to the convex portions and concave portions having the corresponding shapes thereto formed on the frictional contact surface 170 of the hub assembly 160, so that the rotary power is transmitted from the pulley 100 to the hub assembly 160. That is, as shown in FIG. 7, a plurality of concave portions 172 and a plurality of convex portions 174 are formed on the frictional contact surface 170 of the hub assembly 160 in such a manner as to be lockedly fitted correspondingly to the convex portions 142a and the concave portions 142b of the friction ring 142. As a result, if the friction ring 142 and the frictional contact surface 170 of the hub assembly 160 are brought into contact with each other, the convex portions 142a of the friction ring 142 is lockedly fitted to the concave portions 172 of the frictional contact surface 170 of the hub assembly 160, thereby rigidly and reliably achieving the transmission of the rotary power to the hub assembly 160.

Figure 6:
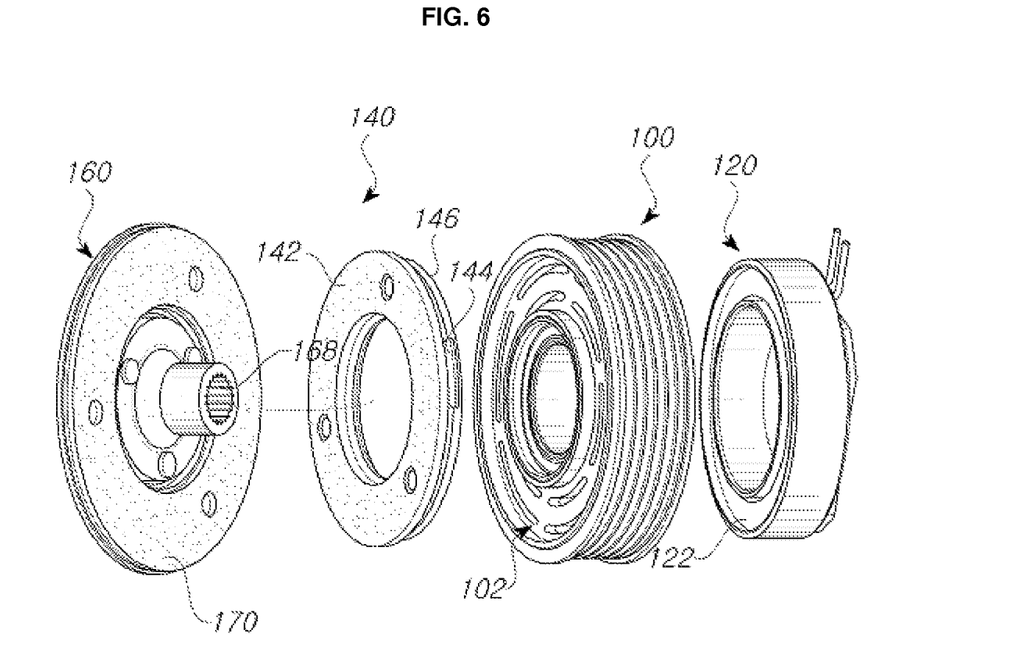
FIG. 6 is an exploded perspective view showing a variation of the disk assembly in the power transmission device for a water pump of FIG. 2.

According to the present invention, at least a portion of each of the frictional surface of the friction ring 142 and the frictional contact surface 170 of the hub assembly 160 is formed of a friction material. For example, at least a portion of the convex portions 142a and the concave portions 142b of the frictional surface of the friction ring 142 is formed of a friction material as will be described later. As a result, the frictional contact surface 170 of the hub assembly 160 is brought into contact with the friction ring 142 and thus serves as a frictional surface capable of transmitting the rotary power. In more detail, the rotary force from the engine of a vehicle is transmitted to the disk assembly 140 through the pulley 100, and next, it is transmitted to the hub assembly 160 through the friction ring 142 and the frictional contact surface 170 of the hub assembly 160, thereby causing the rotary shaft to rotate. As shown in FIG. 7, the frictional contact surface 170 of the hub assembly 160 has the convex portions 174 and the concave portions 172 formed alternatively to each other on a friction portion 176, and a stepped portion is formed between each convex portion 174 and each concave portion 172. Further, the friction material is formed on at least a portion of the convex portions 174 and the concave portions 172. Alternatively, the friction material may be formed selectively on any portions of the frictional contact surface 170 of the hub assembly 160 and the friction ring 142, and as shown in FIG. 6, it may be formed entirely on the contact surfaces between the frictional contact surface 170 and the friction ring 142.

Figure 4:
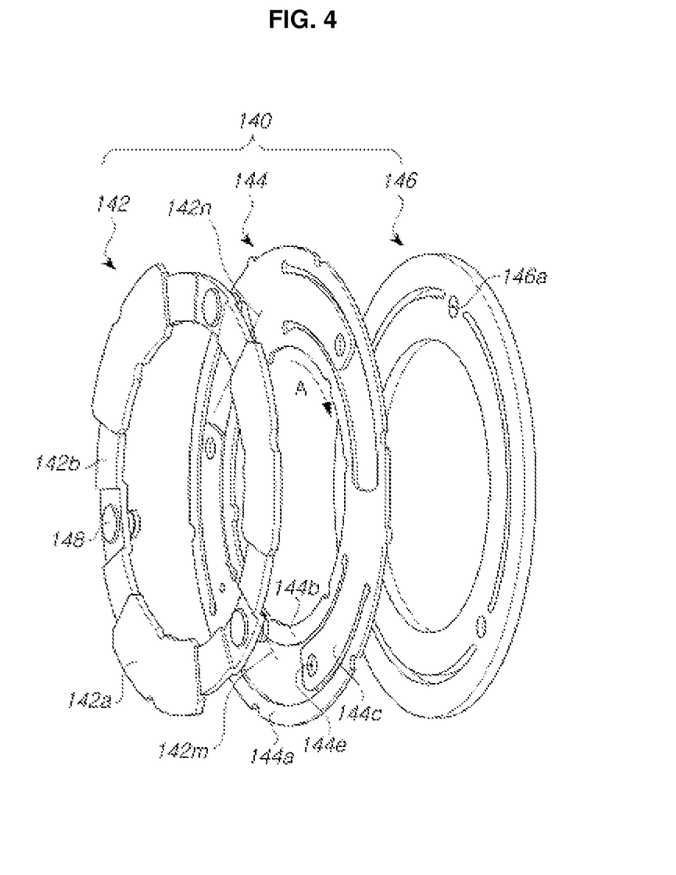
FIG. 4 is an exploded perspective view showing another configuration of a disk assembly in the power transmission device for a water pump of FIG. 2.

FIG. 4 shows a variation of the resilient arms 144c of the resilient ring 144 as described in the first embodiment of the present invention, which are disposed in a form of an arch-shaped cantilever between the outer ring 144a and the inner ring 144b. However, the resilient arms 144c are different from those in FIG. 3 in that they are extended from the attached end portion toward the free end portion in the direction of an arrow A, and such rotating direction corresponds with the direction of the rotation of the pulley 100 by the rotary power received from the engine, which also corresponds with the direction of the rotation of the rotary shaft for the supply of cooling water.

As mentioned above, the rivets 148 of the friction ring 142 are passed through the coupling holes 144e and are thus coupled with the resilient ring 144 and the disk 146. In more detail, the rivets 148 are coupled to the concave portions 142b of the friction ring 142, and the coupling holes 144e are formed on the free end portions of the resilient arms 144c.

The resilient arms 144c resiliently support the friction ring 142 against the hub assembly 160. The forces of the resilient arms 144c resiliently supporting the friction ring 142 should be most strongly applied from the free end portions thereof. Also, when the friction ring 142 is brought into contact with the frictional contact surface 170 of the hub assembly 160, a strong contact pressure should be applied to the friction ring 142. That is, the resilient arms 144c of the resilient ring 144 have to pressurize the friction ring 142 with sufficiently strong resilient forces, which enables the friction ring 142 and the frictional contact surface 170 of the hub assembly 160 to be firmly contacted to make the rotary force transmitted to the hub assembly 160. If the forces applied to the friction ring 142 are not sufficient to apply a relatively strong contact pressure between the friction ring 142 and the frictional contact surface 170 of the hub assembly 160, the friction ring 142 and the frictional contact surface 170 of the hub assembly 160 slide against each other, thereby causing them to idle.

The resilient arms 144c formed to the shape of the cantilever extended in the rotating direction can pressurize the friction ring 142 with the forces stronger than those caused by the resilient arms formed in the opposite direction thereto, so that when the friction ring 142 is brought into contact with the frictional contact surface 170 of the hub assembly 160, a sufficient contact pressure can be applied to the friction ring 142.

Figure 5:
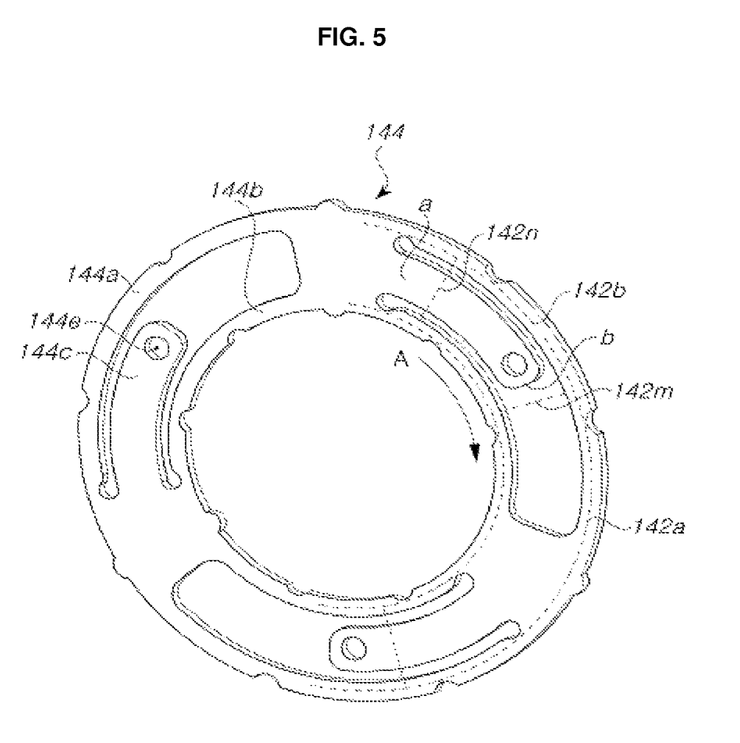
FIG. 5 is a front view showing a resilient ring of the disk assembly of FIG. 4.

Referring to FIG. 5, the free end portions b of the resilient arms 144c pressurize the friction ring 142 more resiliently than the attached end portions a toward the hub assembly 160. That is, the free end portions b of the resilient arms 144c have relatively larger displacement quantity from the outer ring 144a or the inner ring 144b than the attached end portions a thereof, while being closer to the hub assembly 160. Accordingly, the free end portions b of the resilient arms 144c pressurize the friction ring 142 against the hub assembly 160 with a maximum degree of resilient force generated therefrom. Thus, the friction ring 142 pressurized by the resilient forces of the resilient arms 144c is rotated in the rotating direction A and is brought into contact with the frictional contact surface 170 of the hub assembly 160.

Alternated long and short dash lines in FIG. 5 show examples of the convex portions 142a and the concave portions 142b, and the boundary portions therebetween form given stepped portions 142m and 142n. In this case, the stepped portions 142m are formed before the resilient arms 144c in the rotating direction, and the stepped portions 142n are formed after the resilient arms 144c in the rotating direction.

In case where the resilient arms 144c are extended in the rotating direction, when the convex portions 142a and the concave portions 142b of the rotating friction ring 142 are coupled with the concave portions 172 and the convex portions 174 of the frictional contact surface 170 of the hub assembly 160, the stepped portions of the friction ring 142 forming the boundaries between the convex portions 142a and the concave portions 142b, which are first coupled with the stepped portions of the hub assembly 160, are the stepped portions 142m formed before the free end portions of the resilient arms 144c in the rotating direction.

Contrarily, in case where the resilient arms 144c are extended in the opposite direction to the rotating direction of the disk assembly 140, the stepped portions of the friction ring 142 forming the boundaries between the convex portions 142a and the concave portions 142b, which are first coupled with the stepped portions forming the boundaries between the concave portions 172 and the convex portions 174 of the frictional contact surface 170 of the hub assembly 160, are the stepped portions 142n formed after the free end portions of the resilient arms 144c in the rotating direction. The positions of the stepped portions 142n are formed correspondingly to the middle portions of the resilient arms 144c. The stepped portions 142n are weaker in the resilient forces than the free end portions b of the resilient arms 144c, and that is, they pressurize the friction ring 142 against the hub assembly 160 with relatively small resilient forces.

Therefore, in case where the resilient arms 144c are extended in the opposite direction to the rotating direction of the disk assembly 140, they pressurize the portions of the friction ring 142 locked to the frictional contact surface 170 of the hub assembly 160 when the friction ring 142 is brought into contact with the frictional contact surface 170, thereby failing to apply a sufficient contact pressure with the hub assembly 160 to the friction ring 142. As a result, when the convex portions 142a and the concave portions 142b of the friction ring 142 are coupled with the concave portions 172 and the convex portions 174 of the frictional contact surface 170 of the hub assembly 160, they are not completely coupled to each other, so that the friction ring 142 slides over the frictional contact surface 170 of the hub assembly 160, thereby causing idling.

Most desirably, therefore, the resilient arms 144c of the resilient ring 144 are extended in the arch-like shape in the same direction as the rotating direction. That is, the formation of the resilient arms 144c in such a manner as to be extended in the same direction as the rotating direction enables a maximum contact pressure to be applied to the friction ring 142 when the friction ring 142 is coupled to the frictional contact surface 170 of the hub assembly 160, so that the friction ring 142 can be momentarily coupled reliably and firmly to the hub assembly 160.

Under the above-mentioned structure, next, an explanation on the operation of the power transmission device for a water pump according to the first embodiment of the present invention will be given.

In case where there is no need for the supply of cooling water to the engine, that is, in case where there is no need for the rotation of the rotary shaft, power source is applied to the field coil 122 to shut power off. If the power source is applied to the field coil 122, an attracting magnetic flux is generated from the field coil 122 to move the disk assembly 140 to the right side of the drawings, that is, toward the pulley 100, so that the friction ring 142 coupled to the disk 146 by means of the rivets 148 is released from the frictional contact with the hub assembly 160. Thus, the rotary shaft is not in a rotating state, and the supply of cooling water is not performed.

If the engine is heated to need the supply of cooling water, the power source applied to the field coil 122 shuts off. If no power source is applied to the field coil 122, the resilient arms 144*c* of the resilient ring 144 fixed to the disk assembly-mounting portion 102 pressurize the friction ring 142 to the left side of the drawings, that is, toward the hub assembly 160, so that the friction surface of the friction ring 142 has the frictional contact with the frictional contact surface 170 of the hub assembly 160 to allow the rotary shaft mounted on the hub assembly 160 to be rotated. As the rotary shaft is rotated, the cooling water is supplied to the engine through the impeller disposed at the rear end portion of the rotary shaft.

Referring to the coupling state between the friction ring 142 and the frictional contact surface 170 of the hub assembly 160 when the friction ring 142 of the disk assembly 140 has the frictional contact with the frictional contact surface 170 of the hub assembly 160 by means of the resilient forces of the resilient arms 144*c*, the convex portions 142*a* of the friction ring 142 are coupled with the concave portions 172 of the frictional contact surface 170, and the concave portions 142*b* of the friction ring 142 are coupled with the convex portions 174 of the frictional contact surface 170 of the hub assembly 160. As mentioned above, at least a portion of the friction ring 142 or the frictional contact surface 170 of the hub assembly 160 is formed of a friction material (for example, the friction portion 176 as shown in FIG. 7). As such, the friction material may be formed on a portion of, or an entire surface of the friction ring 142 or the frictional contact surface 170 of the hub assembly 160, and if it is formed on a portion thereof, it is desirable that the corresponding coupling surfaces of the two members should be formed with a friction material. In the state where the friction ring 142 and the frictional contact surface 170 of the hub assembly 160 are coupled to each other, the rotary power can be transmitted from the pulley 100 to the hub assembly 160 in accurate, rapid and firm manners, by means of the sufficient friction force provided from the friction portions as well as the coupling surfaces between the concave portions and the convex portions.

Moreover, as shown in FIGS. 4 and 5, since the resilient arms 144*c* are extended along the circumferential direction in the rotating direction of the pulley 100, the stepped portions 142*m* formed before the resilient arms 144*c* in the rotating direction are coupled to the stepped portions of the hub assembly 160. The coupled positions of the resilient arms 144*c* are formed, on which a maximum contact pressure is applied to the friction ring 142, in case where the friction ring 142 is really coupled to the frictional contact surface 170 of the hub assembly 160, so that the idling between the disk assembly 140 and the hub assembly 160 can be prevented to transmit the rotary power reliably and to achieve synchronization.

Next, an explanation on a variation of the power transmission device according to the first embodiment of the present invention will be given with reference to FIG. 6.

The variation as shown in FIG. 6 has the same configuration as in the first embodiment of the present invention, except that the friction surfaces of the friction ring 142 and the frictional contact surface 170 of the hub assembly 160 are configured in a different manner from those of the first embodiment of the present invention. Therefore, the same components as those in the first embodiment of the present invention are denoted by the same reference numerals as each other, and also, a detailed description on them will be avoided.

According to the variation of the first embodiment of the present invention, the friction ring 140 has the friction surface made of a material having a sufficient friction force and a shape of a flat plate with no concave and convex portions formed thereon.

The hub assembly 160 has a shaft hole 168 formed at the center thereof, into which the rotary shaft is insertedly fitted, and since the frictional contact surface 170 of the hub assembly 160 entirely has the friction surface made of the friction material having the sufficient friction force, the power can be transmitted by means of the friction force between the frictional contact surface 170 and the friction ring 142 of the disk assembly 140 when they are contacted with each other.

Next, the friction materials used for the friction ring 142 and the frictional contact surface 170 of the hub assembly 160 contacted with each other so as to perform the power transmission will be described. According to the present invention, the power transmission can be accurately performed by means of the contact force between the friction ring 142 and the frictional contact surface 170 of the hub assembly 160 and further by means of the mechanical coupling between the convex portions 142*a* and the concave portions 142*b* of the friction portions of the friction ring 142 and the convex portions 174 and the concave portions 172 corresponding to the frictional contact surface 170 of the hub assembly 160 through the lock fitting manner, and during the rotation of the pulley 100 at a high speed, for example, at 9000 rpm, accurate and rapid synchronization can be maintained at the time of the power transmission to the hub assembly 160, thereby preventing the pulley 100 from idling on the hub assembly 160.

Thus, the friction portion between the friction ring 142 and the frictional contact surface 170 of the hub assembly 160 should have a higher friction force than a steel material generally used as a material thereof. For example, fiber components are added to the steel material to improve the friction force, and therefore, the friction portion can be made of steel fibers. In addition, a variety of materials used for making an automobile brake disk pad may be adopted, and for example, the friction material may be made of a composite material to which resin, rubber, Kevlar, melamine, aramid fibers, potassium titanate, and the like are added. Like this, the friction material used for the parts transmitting power using the friction force is desirably made of a material having a friction coefficient of more than 0.3. If the friction coefficient of the friction material is less than 0.3, the pulley is likely to idle during the high speed rotation at 9000 rpm.

Figure 8:
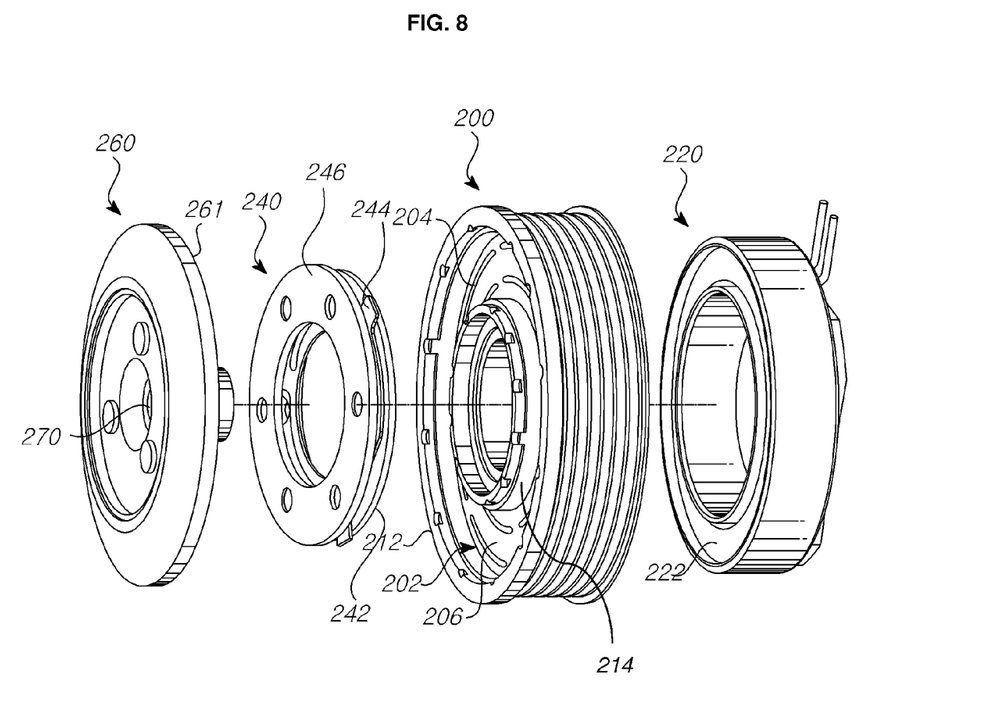
FIG. 8 is an exploded perspective view showing a power transmission device for a water pump according to a second embodiment of the present invention.
Figure 9:
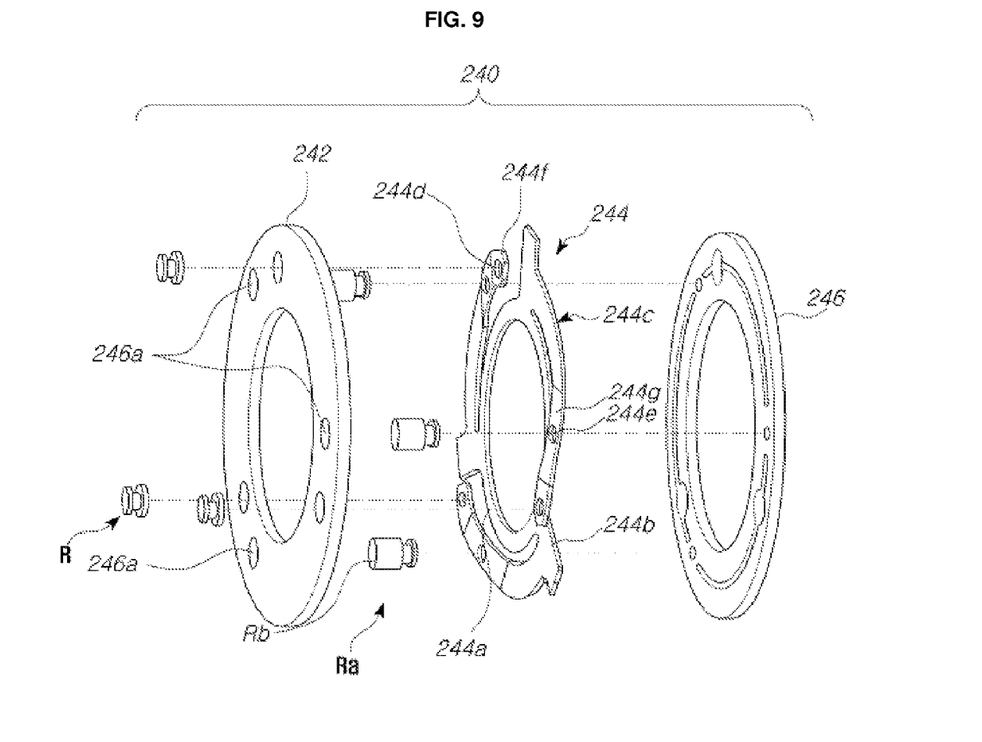
FIG. 9 is a perspective view showing a hub assembly in the power transmission device for a water pump of FIG. 8.
Figure 10:
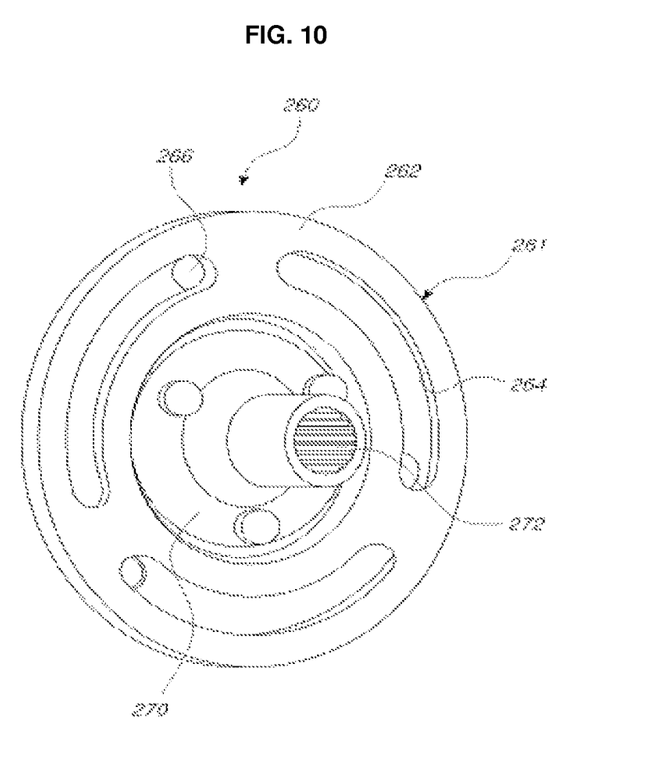
FIG. 10 is a perspective view showing a frictional surface of a hub assembly in the power transmission device for a water pump according to the second embodiment of the present invention.

Referring next to FIGS. 8 to 10, an explanation on a power transmission device for a water pump according to a second embodiment of the present invention will be in detail given.

According to the second embodiment of the present invention, as shown in FIGS. 8 and 9, a magnetic flux generating means 220 and a pulley 200 have the same configuration as those in the first embodiment of the present invention, except that the disk assembly and the hub assembly are different in configuration from those in the first embodiment of the present invention. Therefore, a detailed description on the same components as those in the first embodiment of the present invention will be avoided.

According to the second embodiment of the present invention, as shown in FIG. 8, in the same manner as the first embodiment of the present invention, a disk assembly 240 basically includes a disk 246, a resilient ring 244 disposed at the front surface of the disk 246 and the friction ring 242 disposed in front of the resilient ring 244, but the detailed configuration and operating effects of the disk assembly 240 are different from those in the first embodiment of the present invention. Hereinafter, they will be discussed.

In the same manner as the first embodiment of the present invention, the disk 246 is moved toward the pulley 200 in response to the magnetic flux generated from a field coil 222 of the magnetic flux generating means 220. The resilient ring 244 includes a support ring 244a, protruding portions 244b extended radially from the support ring 244a, and resilient arms 244c extended from the protruding portions 244b in the circumferential direction of the support ring 244a. The resilient arms 244c serve to pressurize the friction ring 242 toward a frictional contact surface 262 of a hub assembly 260.

Each resilient arm 244c is formed in such a manner as to have the attached end portion, the intermediate portion 244g, and the free end portion 244d protruded gradually toward the friction ring 242, when viewed from the plane, so as to pressurize the friction ring 242 toward the frictional contact surface 262 of the hub assembly 260. Accordingly, the resilient arms 244c are entirely inclined toward the friction ring 242, and the free end portions 244d are more protruded than the intermediate portions 244g toward the friction ring 242. That is, the intermediate portions 244g of the resilient arms 244c are more protruded forwardly than the support ring 244a toward the friction ring 242, and the free end portions 244d of the resilient arms 244c are more protruded than the intermediate portions 244g toward the friction ring 242. According to the second embodiment of the present invention, the number of resilient arms 244c is three, but it is not limited thereto. Further, each free end portion 244d has a coupling hole 244f formed thereon.

The friction ring 242 serves to transmit the rotary force applied from the pulley 200 to the hub assembly 260 through the contact with the hub assembly 260. Also, if the friction ring 242 is separated from the hub assembly 260, the rotary force applied from the pulley 200 is not transmitted to the hub assembly 260.

Referring to the coupling relation between the friction ring 242, the resilient ring 244 and the disk 246, the friction ring 242 is coupled to the resilient ring 244 by means of rivets R passed through the coupling holes 244f formed on the free end portions 244d of the resilient arms 244c of the resilient ring 244. Since the free end portions 244d of the resilient arms 244c are protruded toward the friction ring 242, a given gap is formed between the friction ring 242 and the resilient ring 244 in the state where the coupling is made by means of the rivets R.

On the other hand, the resilient ring 244 and the disk 246 are coupled to each other by means of head rivets Ra. Each head rivet Ra has a protruding head Rb extended toward the friction ring 242 in such a manner as to be protruded toward the friction ring 242 by a given distance in the state where the resilient ring 242 and the disk 246 are coupled to each other. The head rivets Ra are passed through coupling holes 244e formed on the intermediate portions 244g of the resilient arms 244c and serve to couple the intermediate portions 244g of the resilient arms 244c with the disk 246.

Accordingly, in the state where the friction ring 242 and the resilient ring 244 are coupled to each other by means of the rivets R and the resilient ring 244 and the disk 246 are coupled to each other by means of the head rivets Ra, the resilient ring 244 and the disk 246 are resiliently spaced apart from each other, and the friction ring 242 and the resilient ring 244 are resiliently spaced apart from each other by a longer gap than the gap between the resilient ring 244 and the disk 246. The protruding heads Rb of the head rivets Ra attached to the intermediate portions 244g of the resilient ring 244 are inserted into the through holes 246a of the friction ring 242, while being not protruded from the friction surface of the friction ring 242 contacted with the frictional contact surface 262 of the hub assembly 260. This is because that the friction ring 242 is coupled to the free end portions 244d of the resilient arms 244c, while having a gap formed from the free end portions 244d by means of the rivets R.

The disk assembly 240 under the above-mentioned configuration is mounted inside a disk assembly-mounting portion 202 of the pulley 200. The resilient ring 244 is fixed to the inside of the disk assembly-mounting portion 202 by means of caulking. That is, the support ring 244a of the resilient ring 244 is caulked around an inner side wall 214, and the protruding portions 244b is caulked around an outer side wall 212, so that the resilient ring 244 is fixed to the disk assembly-mounting portion 202 of the pulley 200. Accordingly, the friction plate 242, which is coupled by means of the rivets R to the coupling holes 244f of the free end portions 244d of the resilient arms 244c of the resilient ring 244, is in a state of being movable by a given distance in the axial direction of the rotary shaft by means of the resilient forces of the resilient arms 244c.

The disk assembly 240 transmits the power applied from the pulley 200 to the hub assembly 260 or shuts off the transmission of the power thereto through the contact or separation with/from the hub assembly 260. The hub assembly 260 has a ring-shaped interlocking plate 261 and a hub 270 coupled to the center of the interlocking plate 261.

The interlocking plate 261 has the frictional contact surface 262 having a given friction coefficient formed on the back surface thereof, and through the contact coupling between the frictional contact surface 262 of the friction ring 242 and the frictional contact surface 262 of the interlocking plate 261, therefore, the interlocking plate 261 is interlocked with the friction ring 242. The interlocking plate 261 has a plurality of grooves 264 formed in the circumferential direction thereof. The number of grooves 264 has the corresponding number of head rivets Ra. Each groove 264 has an interlocking hole 266 formed at the most front portion thereof in the rotating direction of the hub assembly 260. The interlocking hole 266 serves to allow each head rivet Ra to be fully fitted thereto, thereby ensuring accurate synchronization. The interlocking holes 266 may be completely passed through the interlocking plate 261, or may be formed of grooves having a higher depth than the grooves 264.

Under the above-mentioned structure, next, an explanation on the operation of the power transmission device for a water pump according to the second embodiment of the present invention will be given.

In case where there is no need for the activation of the water pump, that is, in case of the initial starting of the engine, there is no need for the activation of the water pump, so that load can be minimized. In this case, power source is applied to the field coil 222. If the power source is applied to the field coil 222, an attracting magnetic flux is generated from the field coil 222 to attract the disk 246 of the disk assembly 240 toward the pulley 200.

If the disk 246 is pulled toward the pulley 200, the intermediate portions 244g of the resilient arms 244c coupled to the disk 246 by means of the head rivets Ra are also pulled toward the pulley 200. As a result, the friction ring 242 coupled to the free end portions 244d of the resilient arms 244c by means of the rivets R are also pulled toward the pulley 200. Like this, if the friction ring 242 is pulled toward the pulley 200, the coupling relation with the interlocking plate 261 of the hub assembly 260 being brought into contact with the friction ring 242 is released. Accordingly, the transmission of power from the pulley 200 to the hub assembly 260 shuts off.

In case where there is a need for the circulation of cooling water to the engine, the supply of the power to the field coil 222 stops, and thus, if the attracting magnetic flux disappears, the resilient arms 244c are resiliently deformed toward the hub assembly 260 by means of their resilient restoring forces. If the resilient arms 244c are resiliently deformed toward the hub assembly 260, the friction ring 242 coupled to the free end portions 244d of the resilient arm 244c is first moved to the hub assembly 260. Thus, if the friction ring 242 moving to the hub assembly 260 is brought into contact with the frictional contact surface 262 of the hub assembly 260, friction between the friction ring 242 and the frictional contact surface 262 occurs. At the initial contact between the friction ring 242 and the frictional contact surface 262, the friction ring 242 and the interlocking plate 261 start to their interlocking, but their complete synchronization is not performed yet.

If the resilient restoring forces of the resilient arms 244c are fully exerted, the complete contact between the friction ring 242 and the frictional contact surface 262 is carried out, thereby allowing the protruding heads Rb of the head rivets Ra coupled to the intermediate portions 244g of the resilient arms 244c to be protruded through the through-holes 246a of the friction ring 242. The protruding heads Rb are inserted into the grooves 264 of the interlocking plate 261, while the friction ring 242 and the interlocking plate 261 are somewhat rotated after their interlocking, and are finally fitted to the interlocking holes 266.

If the protruding heads Rb are insertedly fitted to the grooves 264, the complete synchronization between the friction ring 242 and the hub assembly 260 is conducted mechanically as well as through the friction force between the friction ring 242 and the frictional contact surface 262 of the hub assembly 260.

This state means that the rotary power of the pulley 200 is fully transmitted to the hub assembly 260, so that the rotary shaft coupled to a shaft-supporting hole 272 of the hub 270 is rotated to rotate the impeller, thereby supplying the cooling water to the engine.

Like this, in the state where the supply of power to the field coil shuts off, the water pump is activated, and if there is no need for the activation of the water pump, as mentioned above, the power is applied to the field coil to stop the operation of the water pump.

According to the second embodiment of the present invention, as described above, if the supply of power to the field coil 222 shuts off to transmit the power applied from the pulley 200 to the rotary shaft of the water pump, the friction ring 242 and the hub assembly 260 start to conduct their interlocking through the friction force between the friction ring and the frictional contact surface 262 of the hub assembly 260 in the initial state, and next, the complete synchronization in their interlocking state is achieved through the mechanical coupling between the head rivets Rb and the grooves 264 of the interlocking plate 261, thereby reliably and rapidly transmitting the rotary power to the hub assembly 260.

As described above, there is provided the power transmission device for a water pump according to the preferred embodiments of the present invention, wherein when the rotary power is transmitted from the pulley, to which the rotary force from the engine is applied, to the hub assembly rotating the rotary shaft for the water pump, the transmission of the power is conducted primarily through the friction between the friction ring and the hub assembly and is continuously conducted through the locking mechanisms, so that the transmission of power from the pulley can be achieved rapidly, stably and reliably, and the rotating speeds can be also synchronized.

Further, since the resilient arms of the resilient ring are extended in the shape of the arch in the rotating direction thereof, the friction ring can be contacted with the hub assembly with a strong contact pressure. When the rotary shaft is rotated to supply cooling water, accordingly, the idling of the friction ring of the disk assembly and the hub assembly can be prevented and at the same time accurate synchronization can be achieved. As a result, the idling of the parts between the friction ring and the hub assembly can be also prevented, thereby improving the reliability of the product and suppressing the damages of the parts.

Additionally, the contact surfaces between the friction ring and the hub assembly are formed of the friction material having a sufficient friction coefficient, so that the power regulation can be more accurately performed.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A power transmission device for a water pump, comprising:
    a pulley (100 or 200) being rotated by a torque applied from an engine and having a magnetic flux generating means-mounting portion (108) formed on one side surface thereof and a disk assembly-mounting portion (102 or 202) formed on the opposite side surface thereof;
    a magnetic flux generating means (120 or 220) mounted on the magnetic flux generating means-mounting portion (108) of the pulley (100 or 200) to generate an attracting magnetic flux therefrom;
    a disk assembly (140 or 240) mounted on the disk assembly-mounting portion (102 or 202) of the pulley (100 or 200) and adapted to have frictional contact with a hub assembly (160 or 260); and
    the hub assembly (160 or 260) having a drive shaft mounted thereon and a frictional contact surface (170 or 262) adapted to have the frictional contact with the disk assembly (140 or 240), the drive shaft being rotated through the frictional contact with the disk assembly (140 or 240),
    wherein the disk assembly (140 or 240) comprises:
    a disk (146 or 246) made of a magnetizable material;
    a friction ring (142 or 242) frictionally contacting with the frictional contact surface (170 or 262) of the hub assembly (160 or 260); and
    a resilient ring (144 or 244) interposed between the disk (146 or 246) and the friction ring (142 or 242) in such a manner as to be fixed to the disk assembly-mounting portion (102 or 202) of the pulley (100 or 200) and adapted to resiliently pressurize the friction ring (142 or 242) toward the hub assembly (160 or 260),
    whereby when the attracting magnetic flux of the magnetic flux generating means (120 or 220) is not applied, the friction ring (142 or 242) makes frictional contact with the hub assembly (160 or 260) through the resilient pressurization of the resilient ring (144 or 244), whereas, when the attracting magnetic flux is applied, the disk (146 or 246) moves toward the pulley (100 or 200) to allow the frictional contact between the friction ring (142 or 242) and the hub assembly (160 or 260) to be released.

2. The power transmission device for a water pump according to claim 1, wherein the resilient ring (144 or 244) comprises at least one installing member adapted to fix the disk assembly (140 or 240) to the disk assembly-mounting portion (102 or 202) of the pulley (100 or 200) and at least one resilient member connected to the installing member.

3. The power transmission device for a water pump according to claim 2, wherein the installing member comprises an outer ring (144a) and an inner ring (144b) fixed correspondingly to an outside wall (112) and an inner wall (114) of the disk assembly-mounting portion (102) of the pulley (100), and the resilient member comprises resilient arms (144c) having a form of an arch-shaped cantilever between the outer ring (144a) and the inner ring (144b).

4. The power transmission device for a water pump according to claim 2, wherein the installing member comprises a support ring (244a) fixed to an inner side wall (214) of the disk assembly-mounting portion (202) of the pulley and protruding portions (244b) extended radially from the support ring (244a) in such a manner as to be fixed to the outer side wall (212) of the disk assembly-mounting portion (202), and the resilient member comprises resilient arms (244c) having a form of an arch-shaped cantilever extended from the protruding portions (244b) in the circumferential direction of the support ring (244a).

5. The power transmission device for a water pump according to claim 4, further comprises:
   a plurality of head rivets (Ra) adapted to be passed through coupling holes (244e) formed on intermediate portions (244g) of the resilient arms (244c) and to couple the intermediate portions (244g) of the resilient arms (244c) with the disk (246), each head rivet (Ra) having a protruding head (Rb) insertable through an opening (246a) in the friction ring (242); and
   a fitting means having a plurality of grooves (264) formed on the frictional contact surface of the hub assembly (260) in the circumferential direction thereof and an interlocking hole (266) formed at each groove (264), whereby when the friction ring (242) and the hub assembly (260) have the frictional contact therebetween, the protruding heads (Rb) of the head rivets (Ra) are lockingly fitted to the grooves (264) formed on the frictional contact surface (262) of the hub assembly (260) and as they are moved along the grooves (264), they are insertedly fitted to the interlocking holes (266).

6. The power transmission device for a water pump according to claim 3, wherein each resilient arm (144c) having a form of an arch-shaped cantilever has a free end portion extended in the circumferential direction toward the opposite direction to the rotating direction of the drive shaft.

7. The power transmission device for a water pump according to claim 3, wherein each resilient arm (144c) having a form of an arch-shaped cantilever has a free end portion extended in the circumferential direction toward the rotating direction of the drive shaft.

8. The power transmission device for a water pump according to claim 3, wherein at least a portion of each of the frictional surface of the friction ring (142) and the frictional contact surface (170) of the hub assembly (160) is formed of a friction material having a friction coefficient of more than 0.3.

9. The power transmission device for a water pump according to claim 3, wherein the number of resilient arms (144c) is three or more.

10. The power transmission device for a water pump according to claim 4, wherein the number of resilient arms (244c) is three or more.

11. The power transmission device for a water pump according to claim 3, wherein each of the frictional surface of the friction ring (142) and the frictional contact surface (170) of the hub assembly (160) is formed of a flat frictional surface.

* * * * *